United States Patent [19]

Toyama et al.

[11] 4,066,346

[45] Jan. 3, 1978

[54] MOTION PICTURE CAMERA WITH A BUILT IN COLOR CONVERSION FILTER

[75] Inventors: Masamichi Toyama; Tomoshi Takigawa, both of Macida; Noritsugu Hirata; Kazuo Ishikawa, both of Yokohama, all of Japan

[73] Assignee: Canon Kabushiki Kaisha, Tokyo, Japan

[21] Appl. No.: 678,685

[22] Filed: Apr. 20, 1976

[30] Foreign Application Priority Data

Apr. 25, 1975 Japan .................................. 50-50476

[51] Int. Cl.² ............................................. G03B 23/02
[52] U.S. Cl. ........................................ 352/72; 354/21; 354/59
[58] Field of Search ................... 352/72, 78 R, 141; 354/21, 59

[56] References Cited

U.S. PATENT DOCUMENTS

| | | | |
|---|---|---|---|
| 3,208,363 | 9/1965 | Easterly | 352/72 |
| 3,421,422 | 1/1969 | Winkler | 352/72 |
| 3,425,326 | 2/1969 | Wasielewski | 352/72 |
| 3,613,535 | 10/1971 | Hirabayashi | 352/72 |
| 3,625,125 | 12/1971 | Iida | 352/72 |

Primary Examiner—Monroe H. Hayes
Attorney, Agent, or Firm—Toren, McGeady and Stanger

[57] ABSTRACT

The present invention relates to a motion picture camera which includes a color conversion filter for adapting the tungsten type film to the daylight photography, a manual operation means capable of taking the filter out of the photographic optical path and compensating the sensitivity of the exposure meter device in accordance with the removal of the filter so as to adapt the tungsten type film to the tungsten light photography and a detecting means for removing the filter from the photographic optical path by detecting that the film is of the daylight type so that the tungsten type film as well as the daylight film can be used. The camera is characterized in that it is provided with a holding means which is functionally engaged with the above mentioned detecting means so as to hold the sensitivity of the above mentioned exposure meter device in the state to be used for the daylight photography with the tungsten type film when the detecting means detects that the loaded film is of the daylight type, whereby the operation of the above mentioned manual operation means is nullified when the daylight film is used.

10 Claims, 18 Drawing Figures

MOTION PICTURE CAMERA WITH A BUILT IN COLOR CONVERSION FILTER

BACKGROUND OF THE INVENTION

1. Field of the Invention

The present invention relates to a motion picture camera which includes a built-in color conversion filter capable of being inserted into and removed from the photographic optical path so as to enable the change over of the photographic modes between the daylight photography and the tungsten light photography so that the tungsten type film and the daylight film can be used selectively.

2. Description of the Prior Art

So far, the so called super 8 system of the 8 mm motion picture camera is so designed that, in principle, the tungsten type film is used, whereby a color conversion filter (hereinafter called A type filter) for adapting the film to the daylight photography is built in. This is done so that, in case of the tungsten light photography, the filter is retired out of the photographic optical path manually or in functional engagement with the mounting of the tungsten light source on the motion picture camera so as to change over the photographic mode has been proposed, for example, by U.S. Pat. No. 3,208,363 (corresponding to DAS 1,204,520) and DAS 1,472,730.

The above mentioned system is in principle intended for the tungsten type film while the daylight film can also be used. In order to use the daylight film, the above mentioned A type filter has to be taken out of the photographic optical path. For this purpose, for example, a notch is provided on one part of the outer wall of the film cartridge containing a tungsten type film to indicate that the film contained in the film cartridge is of the tungsten type while no such notch is provided on the film cartridge containing the daylight film. Accordingly by making use of this difference, the selection as to whether the above mentioned filter is to be left in the photographic optical path or taken out of the optical path is automatically made at the time of loading the film cartridge into the camera.

Further in accordance with this system, another notch is provided on the film cartridge to automaticaly adjust the exposure of the camera in accordance with the sensitivity of the loaded film. Thus the position of the notch is so chosen that for example that of a tungsten type film (ASA40) coincides with that of a daylighr film (ASA25) in such a manner that the difference between the sensitivities coincides with the exposure compensation factor of the above mentioned A type filter.

Therefore, in the present system, in order to change over the daylight photographic mode with tungsten type film into the tungsten light photographic mode with tungsten type film, the A type filter is taken out of the photographic optical path whereby the substantial sensitivity of the film is increased so that it becomes necessary to compensate the sensitivity of the exposure meter device correspondingly. This is carried out for example in such a manner that the ND filter (neutral density filter) provided for insertion into or removal from the incident light optical path of the light sensing element in the exposure measuring circuit is retired out of the incident optical path in functional engagement with the retirement of the above mentioned A type filter or the value of the resistance in the exposure measuring circuit is varied in functional engagement of the above mentioned A type filter.

This compensation of the sensitivity of the exposure meter device is necessary only in case of changing over the daylight photographic mode with tungsten type film into the tungsten light photographic mode with tungsten type film and not necessary at all in the case of photographic mode with daylight film. However, in the case of the camera so designed that the change over operation of the photographic modes (including the compensation operation of the sensitivity of the exposure meter device) is manually carried out, such misoperation often takes place as the unnecessary compensation of the sensitivity of the exposure meter device is carried out even in the case of the tungsten light photographic mode with daylight film so that pictures with remarkably inproper exposure are often taken.

SUMMARY OF THE INVENTION

A principal purpose of the present invention is, the above mentioned situations being taken into consideration, to offer a novel camera so designed that, regardless of the difference of the kinds of the film to be used and the change over of the photographic modes, the proper exposure can always be obtained.

In connection with the above mentioned purpose of the present invention, another purpose of the present invention is, considering the change over of the photographic modes as well as the compensation of the sensitivity of the exposure meter device being manually carried out, to offer a camera so designed that even if such misoperation as mentioned above is carried out in case the daylight film is used, the then compensation of the sensitivity of the exposure meter device is made invalid so as to be able to always take pictures with the proper exposure.

Further, another purpose of the present invention is, in connection with the above mentioned purposes, to improve a camera including a built in color conversion filter for enabling the selective utilization of the tungsten type film and the daylight film and the change over of the photographic modes between the daylight photography and the tungsten light photography with those films, so designed that the color conversion filter is selectively inserted and retired into and out of the photographic optical path in functional engagement with the loading of the film cartridge into the camera as well as the manual operation of the camera housing from outside, in such a manner that a novel fool-proof device for the exposure adjustment is composed.

Further another purpose of the present invention is to offer a fool-proof device by means of which the exposure can be adjusted in a very simple way in accordance with the change over of the kinds of the film to be used and of the photographic modes without complicating the mechanism of such a camera as includes a built in color conversion filter.

Further another purpose of the present invention is to offer a fool-proof device which is very profitable for the exposure adjustment, which device can be applied to the super-8-system now widely practiced of the 8 mm motion picture camera without any modification.

In order to meet the above mentioned problems and purposes in accordance with the present invention, the motion picture camera is so designed that the detecting means for determining the insertion and the removal of the above mentioned A type filter into and from the photographic optical path by detecting whether the film to be used is of the tungsten type or of the daylight type is engaged with a holding means for holding the sensitivity of the above mentioned exposure meter device. This is done in such a manner that when the daylight film is used, the operation of the manual operation means for inserting and removing the above mentioned A type filter into and from the photographic optical path and for compensating the sensitivity of the exposure meter device in accordance with the insertion and the retirement of the filter is made invalid so as to keep the sensitivity of the exposure meter device in the state to be used for the daylight photography with a tungsten type film.

Further other purposes and features of the present inventon will be disclosed from the explanation to be made below in accordance with the embodiments shown in the accompanying drawings.

BRIEF DESCRIPTION OF THE DRAWINGS

FIG. 1 shows the case where the daylight photography is carried out with the tungsten type film.

FIG. 2 shows the case where the tungsten light photography is carried out with the tungsten type film.

FIG. 3 shows the case where the daylight photography is carried out with the daylight film.

FIG. 4 shows the case where the tungsten light photography is carried with the daylight film.

FIGS. 5 and 6 show the case where the daylight photography is carried out with the tungsten type film.

FIGS. 7 and 8 show the case where the tungsten light photography is carried out with the tungsten type film.

FIGS. 9 and 10 show the case where the tungsten light photography is carried out with the daylight film, whereby;

FIG. 6 shows the I — I view of FIG. 5.

FIG. 8 shows the II — II view of FIG. 7.

FIG. 10 shows the III — III view of FIG. 9.

FIGS. 11 and 12 show the case where the daylight photography is carried out with the tungsten type film.

FIGS. 13 and 14 show the case where the tungsten light photography is carried out with the tungsten type film.

FIGS. 15 and 16 show the case where the tungsten light photography is carried out with the daylight film, whereby;

FIG. 12 shows IV — IV view of FIG. 11.

FIG. 14 shows V — V view of FIG. 13, and

FIG. 16 show VI — VI view of FIG 15.

FIG. 18 shows the important composition of a variation of the embodiment shown in FIGS. 11 – 16 and FIG. 17, whereby the compensation of the sensitivity of the exposure meter device due to the changing over of the photographic mode is designed to be carried out by means of the electrical means such as resistances and so on.

DETAILED DESCRIPTION OF THE PREFERRED EMBODIMENT

Figure 1:
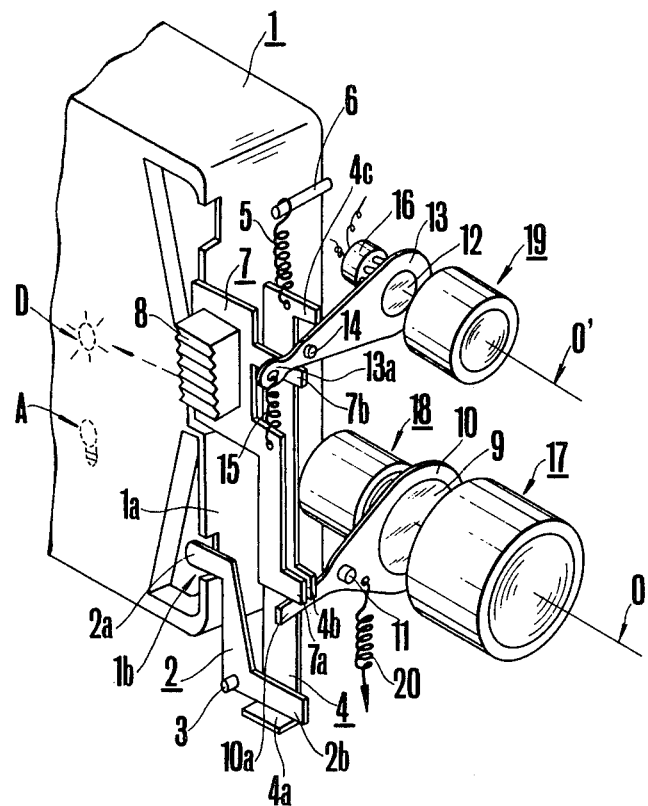
FIGS. 1 to 4 respectively show an embodiment of a motion picture camera in which the present invention is applied, especially the important composition improved in accordance with the present invention in perspective view, whereby.

Below the present inventon will be explained in detail in accordance with the embodiment of the present invention shown in the accompanying drawings.

FIGS. 1 to 4 show various photographic modes for taking pictures with tungsten type film or daylight film of an embodiment of the motion picture camera in which the present invention is applied, whereby only the components improved in accordance with the present invention are shown while other components not shown in the drawings are to be understood of the same composition as those of the conventional motion picture camera.

Figure 2:
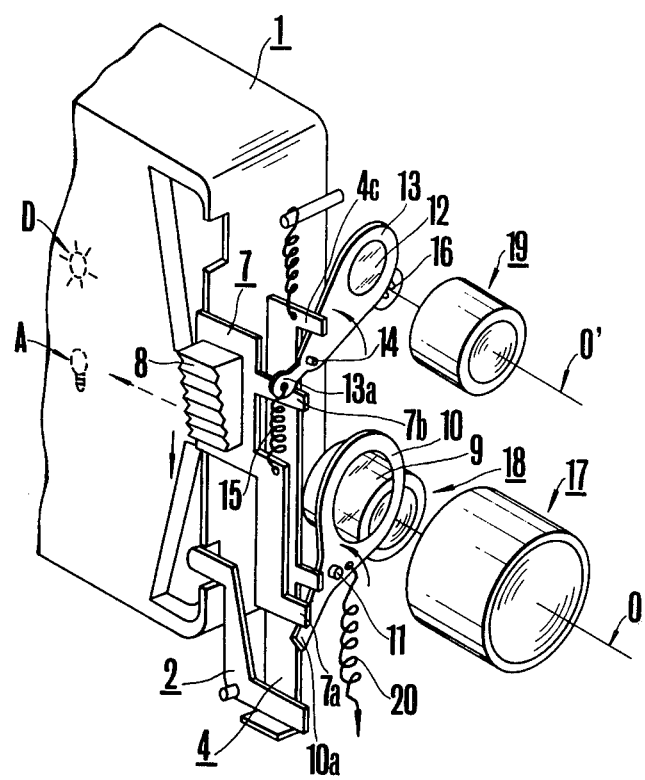

FIGS. 1 and 2 show the case where the tungsten light and the daylight photography are carried out with the tungsten type film.

Figure 3:
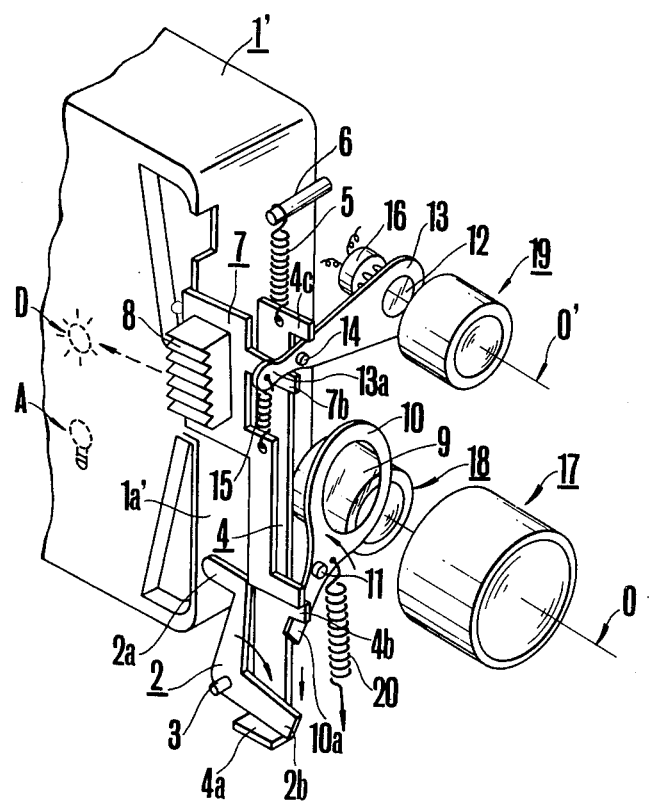
Figure 4:
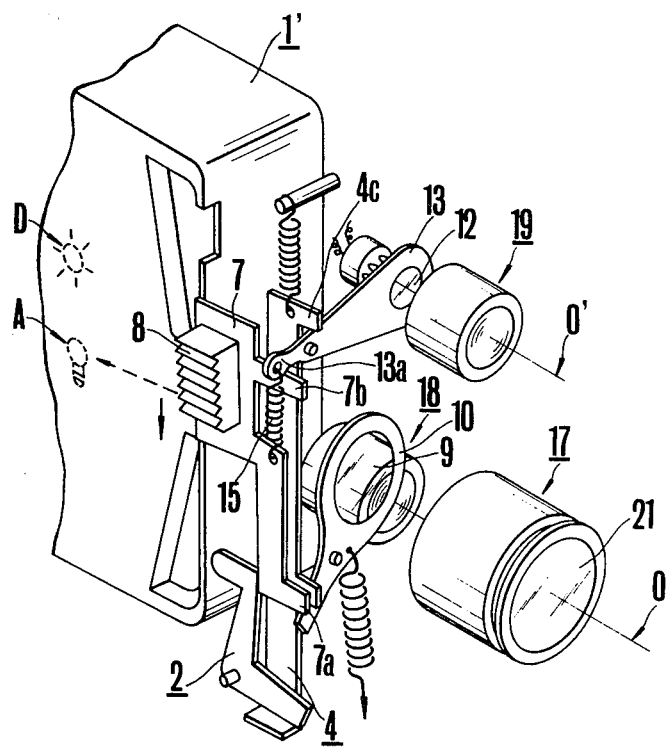

FIGS. 3 and 4 show the case where the tungsten light and the daylight photography are carried out with the daylight film, whereby 2 is a notch detecting member as film type detecting means rotatably born by a pin 3 provided on the side wall of the camera body not shown in the drawing. The one end 2a of the detecting member 2 is capable of detecting the existence of the notch for telling that the loaded film is for the tungsten light, at a certain determined position on the front outer wall of the film cartridge, while the other end 2b is engageable with the folded piece 4a of the slide member 4 slidable upwards and downwards in the drawing by means of a guide mechanism not shown in the drawing. The slide member 4 further includes an operation arm 4b for bringing the A type filter 9 to be used when the tungsten type film is used under daylight into the photographic optical path 0 and the control arm 4c as holding member for holding the sensibility of the exposure meter in the usable state when the tungsten type film is used under daylight by controlling the retirement of the ND-filter 12 for varying the amount of the light incident on the light sensing element 16 connected to a conventional exposure meter device not shown in the drawing out of the incident light path 0', being urged upwards in the drawing by means of a spring member 5 provided between the one end of the slide member 4 and the pin 6 secured on the camera body.

7 is the change over member for changing over the photographic mode between the daylight photography and the tungsten light photography, presenting the operation arm 7a and the projecting arm 7b for inserting and retiring the above mentioned A type filter 9 into and output the photographic optical path and being capable of assuming two positions for the daylight photography respectively the tungsten light photography by means of a conventional crick stop mechanism. 8 is the operation knob as the manual operation means for manually operating the change over member 7 from outside of the camera. D and A are respectively the indices for showing the daylight photographic mode position and the tungsten light photographic mode position for the operation knob 8.

The above mentioned A type filter 9 is held by means of the filter holding member 10 which is rotatably born by means of the pin 11 provided on the camera body and urged along the clockwise direction in the drawing around the pin by means of the spring member 20 whereby the operation arm 4b of the slide member 4 as well as the operation arm 7a of the change over member 7 is engageable with the tail end 10 of the spring member 20. Further the above mentioned ND filter 12 is held by means of the filter holding member 13, which is rotatably born by means of a pin 14 provided on the camera body. Between the tail end 13a of the holding member 13 and the above mentioned change over means 7 a spring member 15 is provided in such a manner that the holding member 13 is connected with the change over member 7 in an elastical way. 17, 18 and 19 are respectively the objective lens system the relay lens system and the light measuring lens system.

With the above mentioned composition, FIGS. 1 and 2 respectively show the case where the tungsten type film is used under daylight and under tungsten light, whereby on the cartridge 1 in which a tungsten light film is loaded, a notch 1b is shaped at the one part of the front outer wall 1a as is shown in the drawing. Consequently, when the cartridge 1 containing this tungsten type film is loaded into the cartridge loading chamber of the camera the detecting member 2 detects the existence of the notch on the outer wall 1a of the cartridge 1 with the end 2a as is shown in the drawing, whereby because in the present case a notch 1b is formed on the outer wall 1a of the cartridge 1, the end 2a of the detecting member 2 enters into the notch 1b in such a manner that the detecting member 2 and the slide member 4 after the member 2 are not changed at all.

Now in the state shown in FIG. 1, the operation nob 8 is set at the index D in such a manner that the motion picture camera is set at the daylight photographic mode, whereby in this state the operaton arm 7a of the change over member 7 does not exercise any action on the filter holding member 10 and in consequence the A type filter 9 is held by means of the operation arm 4b of the slide member 4 in the inserted state into the photographic optical path 0, while the projecting arm 7b of the change over member 7 controls the rotation of the filter holding member 13 around the pin 14 along the counter clockwise direction in the drawing in such a manner that the ND filter 12 is held in the inserted state into the incident light path 0'.

Hereby the control arm 4c of the slide member 4 is in the state allowing the rotation of the filter holding member 13 around the pin 14 along the counter clockwise direction in the drawing.

When the knob 8 is set at the index A in order to carry out the tungsten light photography (FIG. 2), by means of the operation of the nob 8 the change over member 7 is moved to the left in the drawing, whereby means of the operation arm 7a the tail end 10a of the filter holding member 10 is pushed so as to rotate the holding member 10 around the pin 11 against the force of the spring member 20 along the counter clockwise direction, to retire the A type filter 9 out of the photographic optical path 0 and at the same time to draw the tail end 13a of the filter holding member 12 in such a manner that the holding member 13 is rotated around the pin 14 along the counter-clockwise direction (whereby the control arm 4c of the slide member 4 is in the state allowing the rotation of the filter holding member 13 as mentioned above) so as to retire the ND filter 12 out of the incident light path 0'.

In this way, the change over of the photographic modes between the daylight photography and the tungsten light photography using the tungsten type film can be obtained. Hereby it goes without saying that the compensation amount of the exposure by means of the ND filter is set in accordance with the exposure compensation factor by means of the A type filter 9.

Below the case the daylight film is used will be explained in accordance with FIGS. 3 and 4. As is shown in the drawing, different from the case with the film cartridge 1 containing the tungsten type film, no notch (1b) is formed on the outer wall 1a' of the film cartridge 1' containing the daylight film. Consequently, when the cartridge 1' containing this daylight film is loaded into the cartridge loading chamber of the camera, the detecting member 2 detects the existence of the notch on the outer wall 1a' of the cartridge 1' with the end 2a, whereby because in the present case no notch is formed on the outer wall 1a', the detecting member 2 is pushed by the outer wall 1a' so as to be rotated around the pin 3 along the clockwise direction in such a manner that the slide member 4 is pulled downwards in the drawing against the force of the spring member 5 by means of the other end 2b through the folded piece 4a. In this way, the slide member 4 rotates the filter holding member 10 around the pin along the counter clockwise direction with the operation arm 4b so as to retire the A type filter 9 out of the photographic optical path 0 and at the same time controls the rotation of the filter holding member 13 around the pin 14 along the counter-clockwise direction with the control arm 4c so as to hold the ND filter 12 in the inserted state into the incident light optical path 0'.

The "then" set state of the above mentioned filters 9 and 12 by means of the slide member 4 has a priority towards the operation of the change over member 7 in such a manner that even if the nob 8 is operated in this state the operation arm 7a of the change over member 7 exercises no effect on the filter holding member 10, whereby further the rotation of the filter holding member 13 is controlled by the control arm 4c of the slide member 4 so that the ND filter 12 is never retired from the incident light optical path 0'.

Namely, in order to carry out the tungsten light photography using a daylight film, it is sufficient to attach a filter 21 (FIG. 4) called B type filter to the A type filter 9, it being not necessary to carry out any sensitivity compensation of the exposure meter device, by changing the nob 8 from the index D (daylight photography) over to the index A (tungsten light photography) as in case of using the tungsten type film, whereby even if the nob 8 is misoperated by the photographer this misoperation is nullified in such a manner that the ND filter 12 remains in the incident light optical path 0', so that the sensitivity of the exposure meter device is kept in a superior condition.

Figure 5:
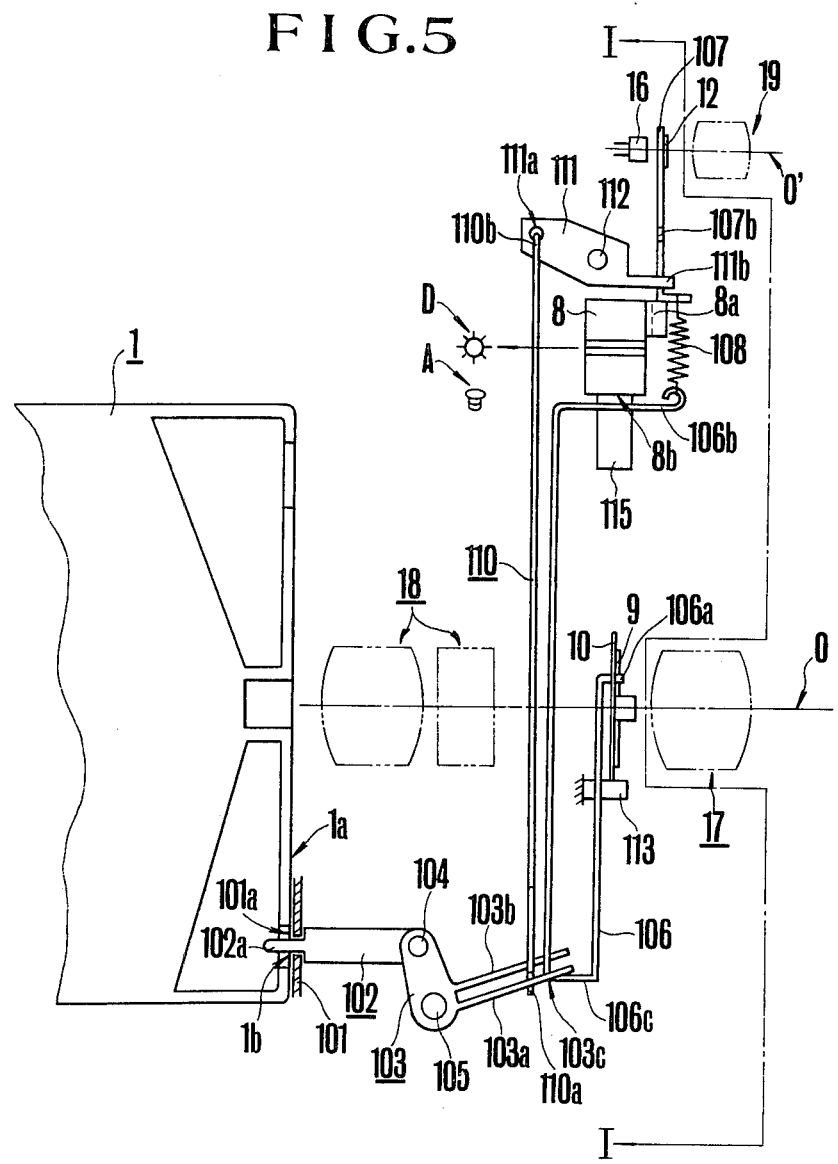
FIGS. 5 to 10 show the composition improved in accordance with the present invention of another embodiment of a motion picture camera in which the present invention is applied, whereby.
Figure 6:
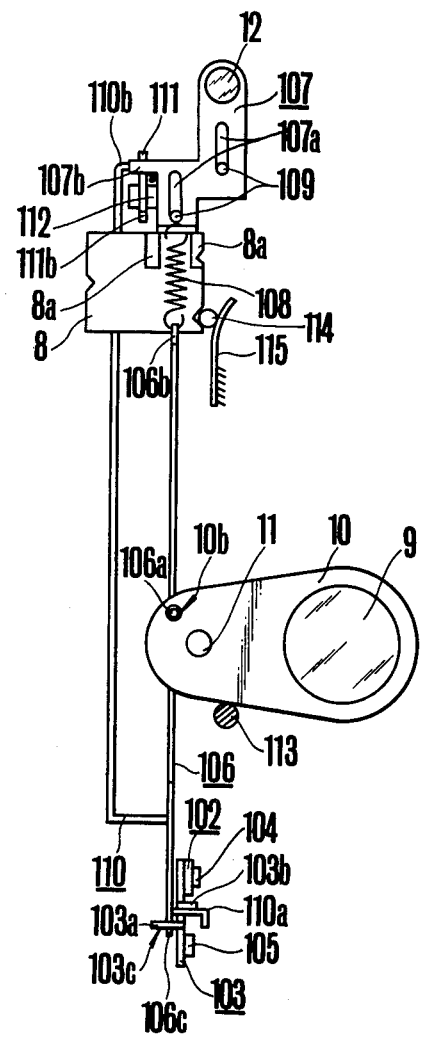
Figure 7:
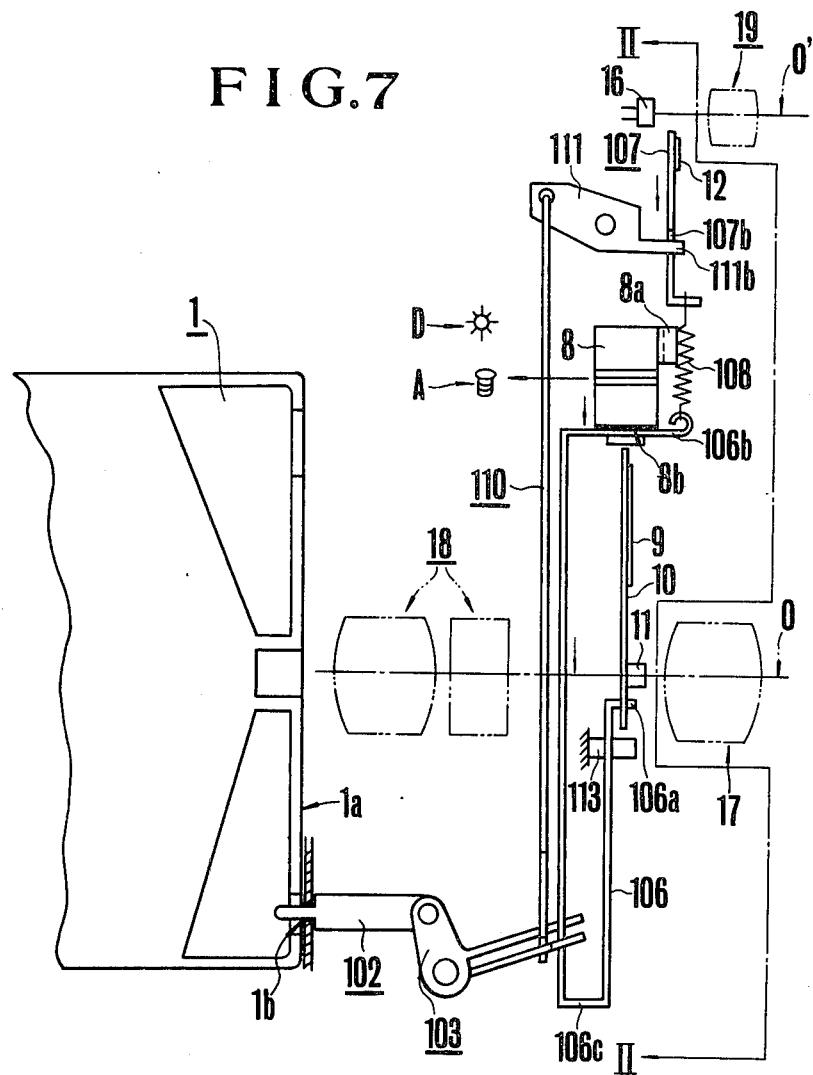
Figure 8:
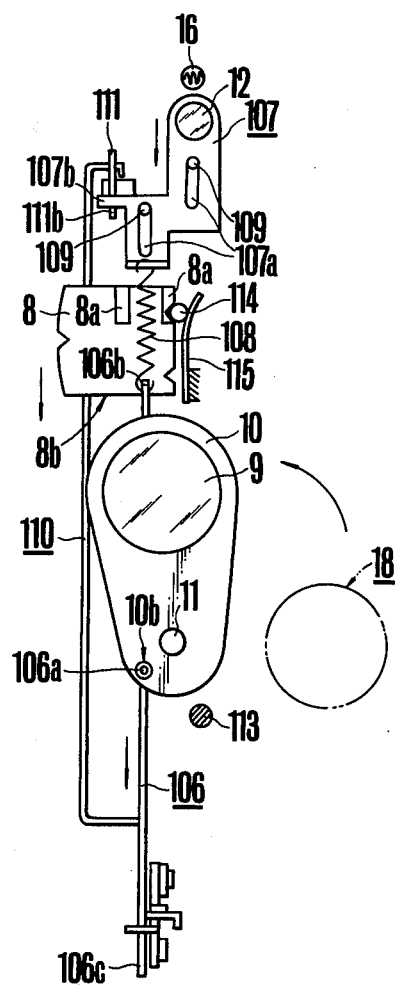
Figure 9:
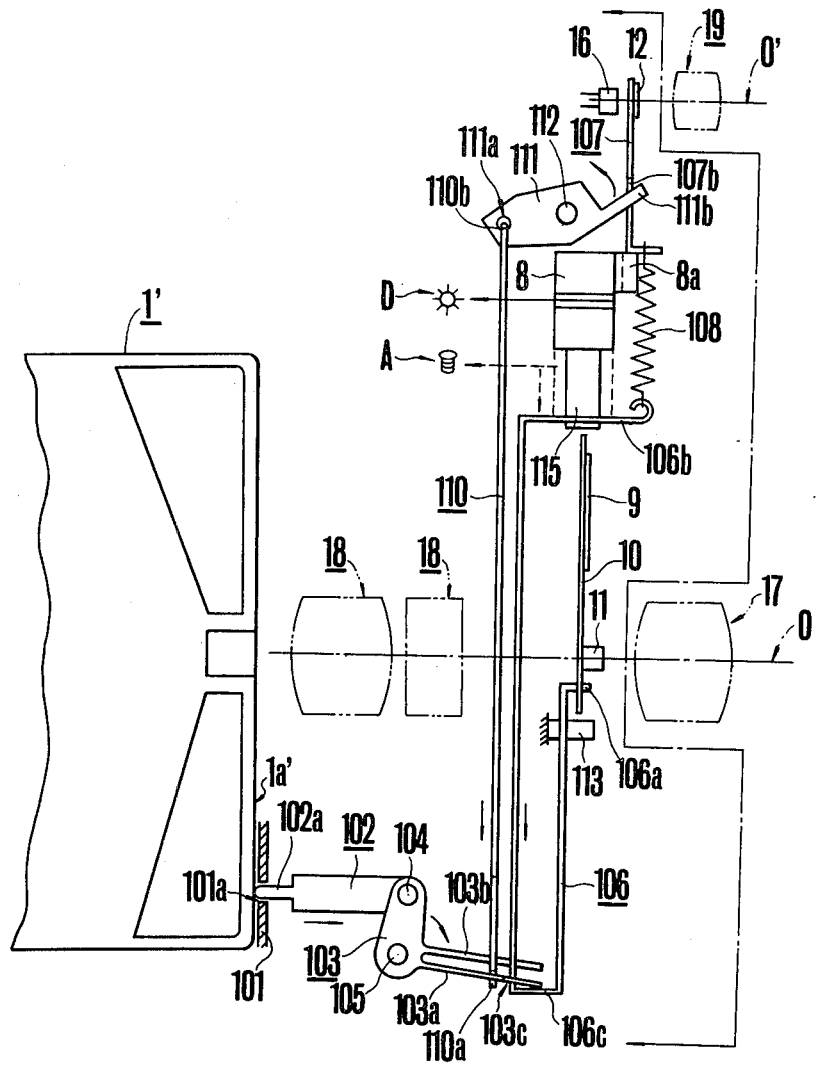
Figure 10:
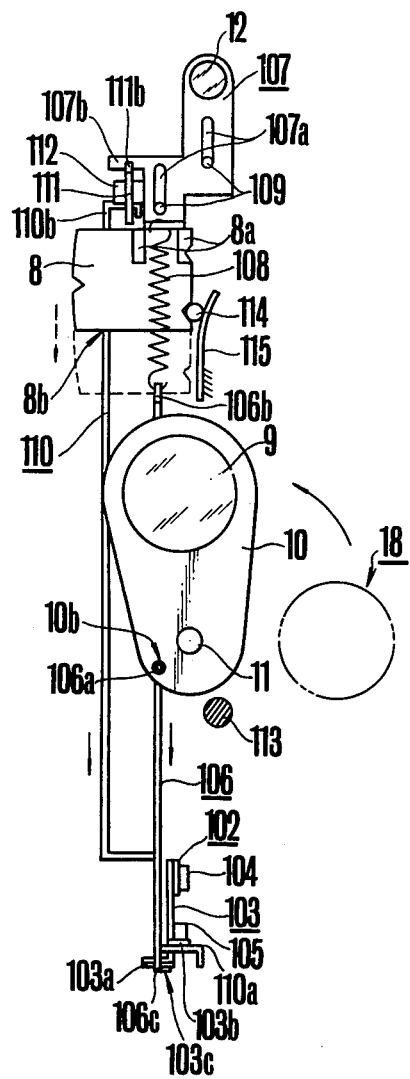

Below another embodiment of the present invention will be explained in accordance with FIGS. 5 and 10. The embodiment shown in FIGS. 5 and 10 is an improvement of that shown in FIGS. 1 to 4, whereby the composition is in principle almost same as that shown in FIGS. 1 to 4. Consequently, the components presenting the same figures as those shown in FIGS. 1 to 4 have the same compositions and the same functions so that their explanations are omitted so far as the understanding of the present invention is not prevented. FIGS. 5 and 6 show the case the daylight photography is carried out with the tungsten type film. FIGS. 7 and 8 show the case the tungsten light photography is carried out with the tungsten type film and FIG. 9 and FIG. 10 show the case the tungsten light photography is carried out with the daylight film whereby in these figures only the components improved in accordance with the present invention are shown as in case of FIGS. 1 to 4.

In the drawings, 102 is the notch detecting member whose end 102a is capable of detecting the existence of the notch on the front outer wall of the film cartridge, entering into the cartridge loading chamber through the hole 101a provided on the one part of the side wall 101 forming the cartridge loading chamber of the camera. 103 is a rotary member rotatably born by means of a shaft 105, connected with the detecting member 102 through the pin 104 and presenting two operation arms 103a and 103b, whereby the rotary member 103 rotates around the shaft 105 when the detecting member 102 slides to the right and the left in the drawing. 106 is the connecting rod for inserting and retiring the filters, passing through the hole 103c provided in the first operation arm 103a of the rotary member 103 and being folded almost in U shape, whereby the one folded part 106a is engaged in the hole 10b of the filter holding member 10 rotatably born by means of the pin 11 while the other folded part 106b is connected with the filter holding member 107 holding the ND filter through the spring member 108. The filter holding member 107 is so designed as to be movable upwards and downwards in the drawing by means of the guide pin 109 engaged in the guide groove 107a presenting a projection arm 107b on the one part.

110 is a connecting rod for controlling the ND filter, whose one folded part 110a is engaged with the second operation arm 103b of the rotary member 103 while the other folded part 110b is engaged in the hole 111a of the control member 110b rotatably born by means of the shaft 112. The control member 111 presents a control arm 111b engaged with the projection arm 107b of the above mentioned filter holding member 107 so as to keep the ND filter 12 to remain in the incident light optical path 0'.

113 is a holding pin for holding the A type filter 9 in the photographic optical path 0 while the outer operation nob 8 presents a holding arm 8a capable of holding the filter holding member 107 so as to keep the ND filter 12 in the incident light optical path 0' and an operation end 8b capable of acting on the folded part 106b of the connecting rod 106, being so designed as to be able to assume the two positions for the daylight photography respectively for the tungsten light photography by means of a conventional crick mechanism consisting of the crick ball 114 and the plate spring 115.

With the above composition the cartridge 1 containing a tungsten type film is loaded into the cartridge loading chamber of the camera as is shown in the drawing, when the detecting member 102 detects the existence of the notch on the front outer wall 1a of the cartridge 1 in such a manner that because in the present case, a notch 1b is provided on the outer wall 1a, the end 102a of the detecting member 102 enters into the notch 1b so that the detecting member 102, the rotary member 103 and the connecting rods 106 and 110 after the detecting member 102 are not displaced.

In the state shown in FIGS. 5 and 6, the nob 8 is set at the index D while the camera is set for the daylight photographic mode, whereby in this state, the A type filter 9 is held in the inserted state into the photographic optical path 0 because the connecting rod 106 is not displaced while the ND filter 12 is held in the inserted state into the incident light optical path 0' because the filter holding member 107 is held by the holding arm 8a of the nob 8. Hereby the control arm 111b of the control member 111 is in the state allowing the downward slide of the filter holding member 107 in the drawing.

Then in order to carry out the tungsten light photography the nob 8 is operated so as to be set at the index A out of the state shown in FIGS. 5 and 6 (FIGS. 7 and 8), when the folded part 106b of the connecting rod 106 is pushed downwards by means of the operation end 8b of the nob 8 in the drawing, whereby by means of the folded part 106a the filter holding member 10 is rotated around the pin 11 along the counter clockwise direction in the drawing so as to take the A type filter 9 out of the photographic optical path 0. Because at this time the engagement of the filter holding member 107 by means of the holding arm 8a of the knob 8 is solved, the member 107 is slided downwards in the drawing until it is controlled by the control arm 111b of the control member 111 due to the effect of the spring member 108 so that the ND filter 12 is taken out of the incident light optical path 0'.

In this way, the change over of the photographic modes between the daylight photography using a tungsten type film and the tungsten light photography using a tungsten type film is accomplished.

Below the case the daylight film is used will be explained in accordance with FIGS. 9 and 10.

When the film cartridge 1' containing a daylight film is loaded into the cartridge loading chamber as is shown in the drawing, the detecting member 102 detects the existence of a notch on the front outer wall 1a' of the cartridge 1' by means of the end 102a. Because in the present case no notch is formed on the outer wall 1a', the detecting member 102 is pushed to the right by means of the outer wall 1a' in FIG. 9 so that the rotary member 103 is rotated around the shaft 105 along the clockwise direction in FIG. 9 whereby the folded part 106c of the connecting rod 106 is pushed by the first operation arm 103a while the folded part 110a of the connecting rod 110 is pushed by the second arm 103b in such a manner that the connecting rods 106 and 110 are displaced downwards in the drawing. Due to the displacement of the connecting rod 106 the filter holding member 10 is rotated around the pin 11 along the counterclockwise direction in FIG. 10 so that the A type filter 9 is taken out of the photographic optical path 0. Due to the displacement of the connecting rod 110 the control member 111 is rotated around the shaft 112 along the counter-clockwise direction in FIG. 9, so that the control arm 111b is brought into contact with the projection arm 107b of the filter holding member 107 so as to let the ND filter 12 always remain in the incident light optical path 0', the downward slide of the filter holding member 107 in the drawing being controlled.

Consequently, even if in the present state the knob 8 is changed over between the index D and the index A, the change over operation at this time is nullified, having nothing to do with the insertion and the retirement of the filters 9 and 10.

Below further another embodiment of the present invention will be explained in accordance with FIGS. 11 – 16. The embodiment shown in FIGS. 11 – 16 is an improvement of the one shown in FIGS. 1 to 10, whereby the compositions are in principle almost same as those shown in FIGS. 1 to 10. In this way, the components presenting the same figures as those in FIGS. 1 to 10 present the same compositions and the same functions.

Figure 11:
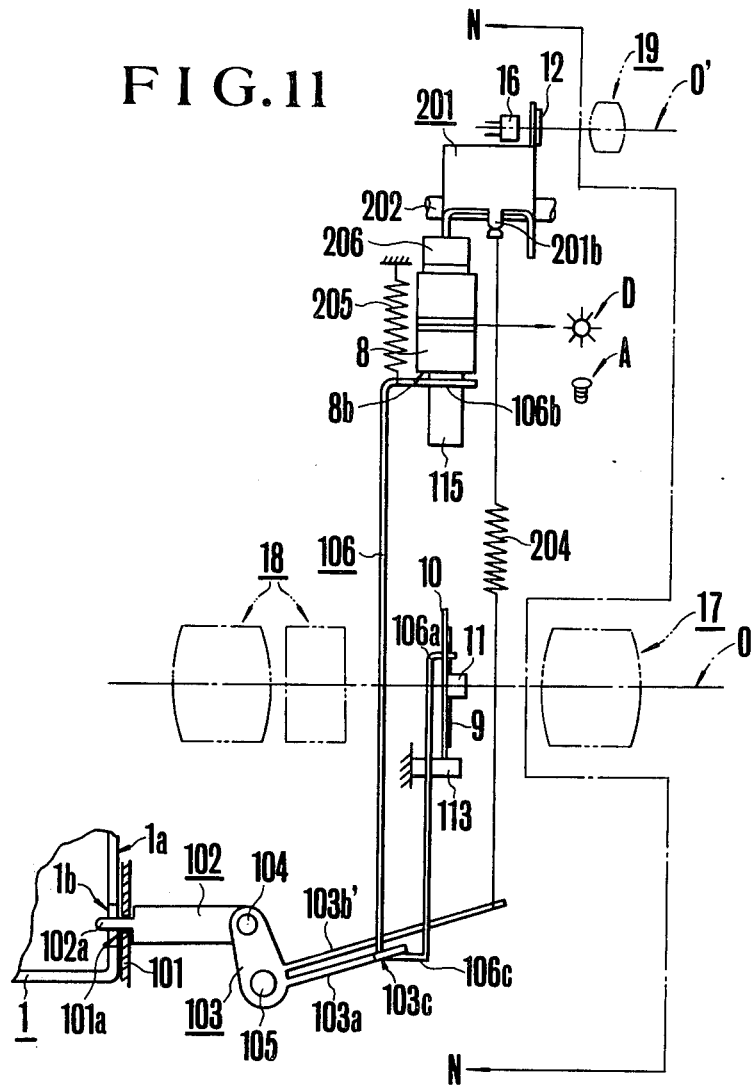
FIGS. 11 – 16 show the component improved in accordance with the present invention, in another embodiment of a motion picture camera in which the present invention is applied, whereby
Figure 12:
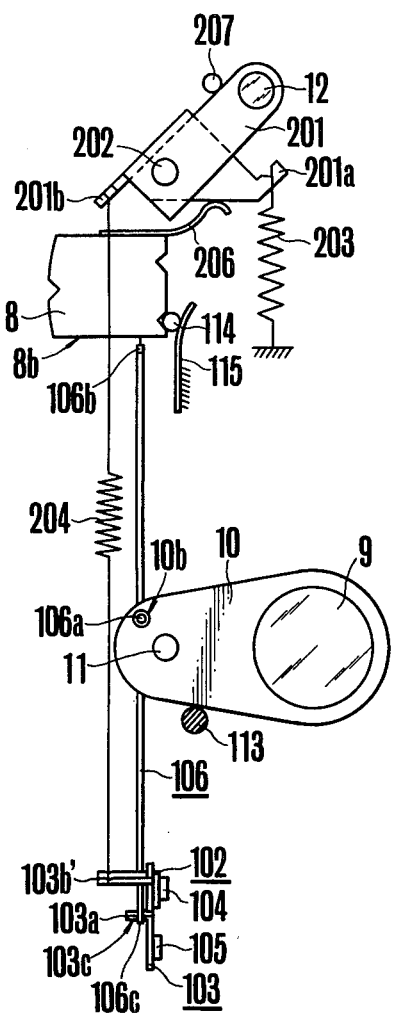
Figure 13:
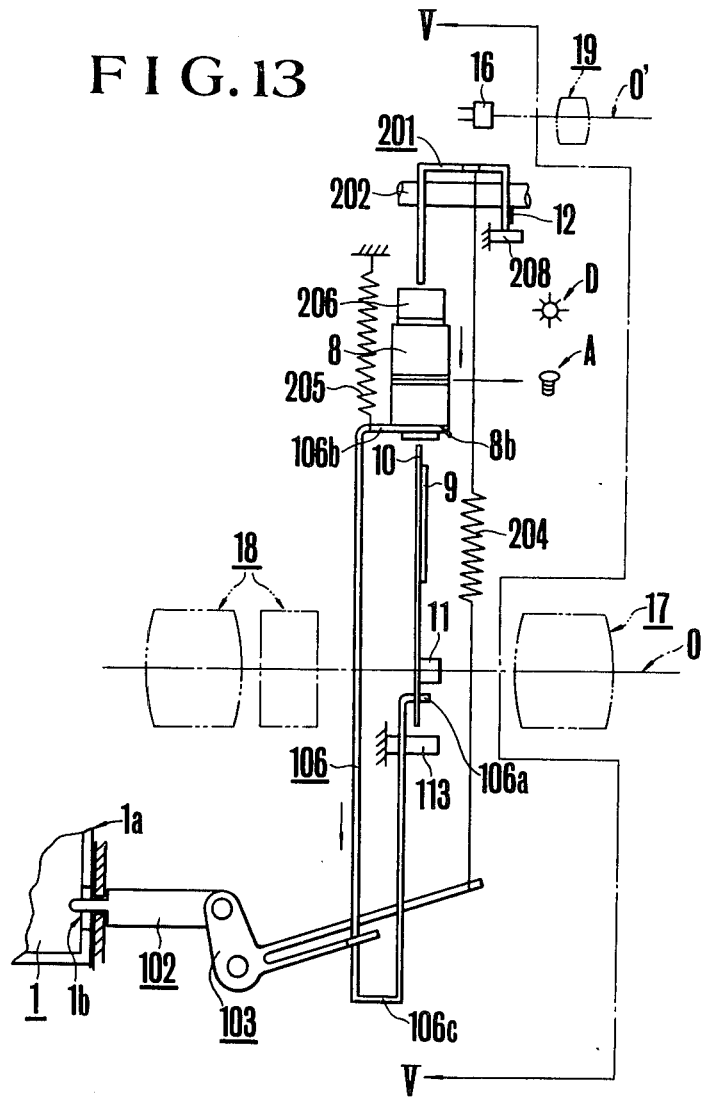
Figure 14:
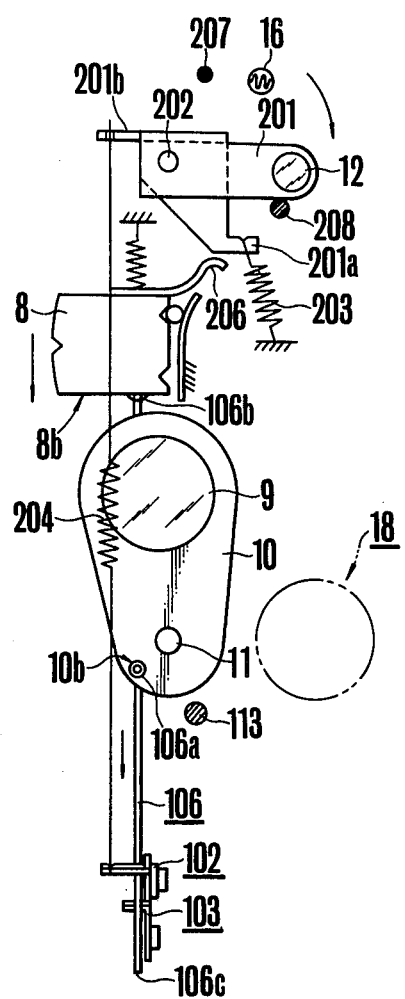

FIGS. 11 and 12 show the case the daylight photography is carried out with the tungsten type film, FIGS.

Figure 15:
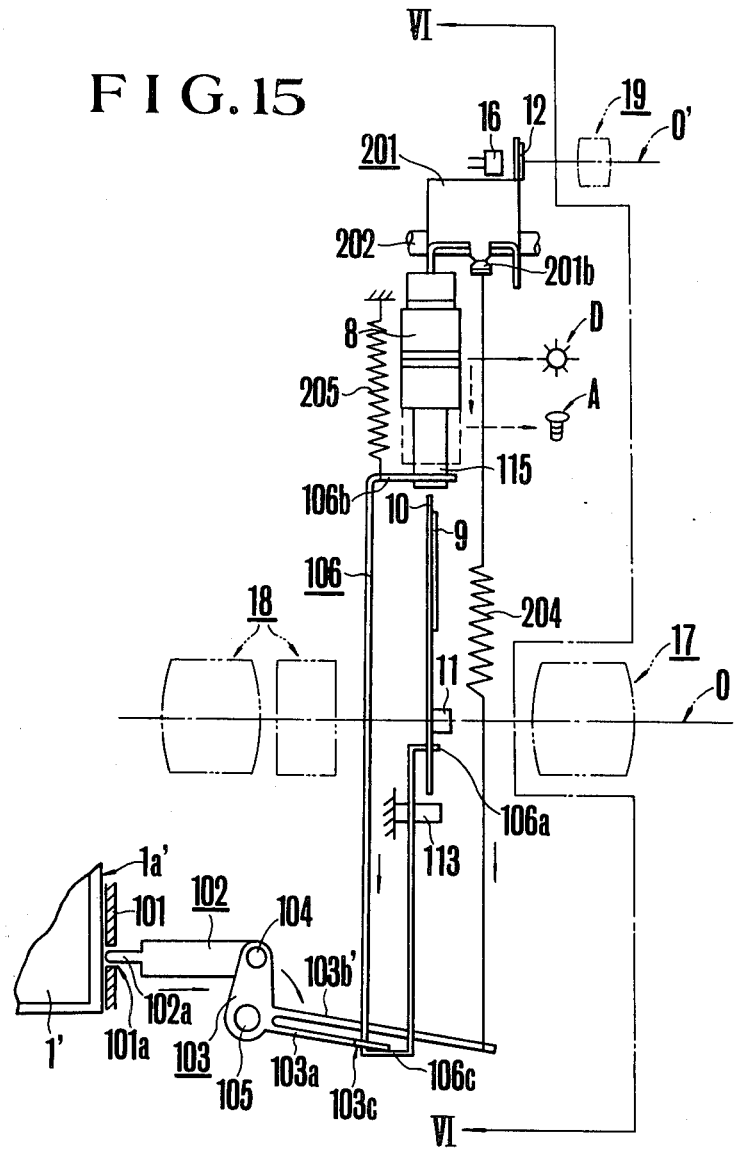
Figure 16:
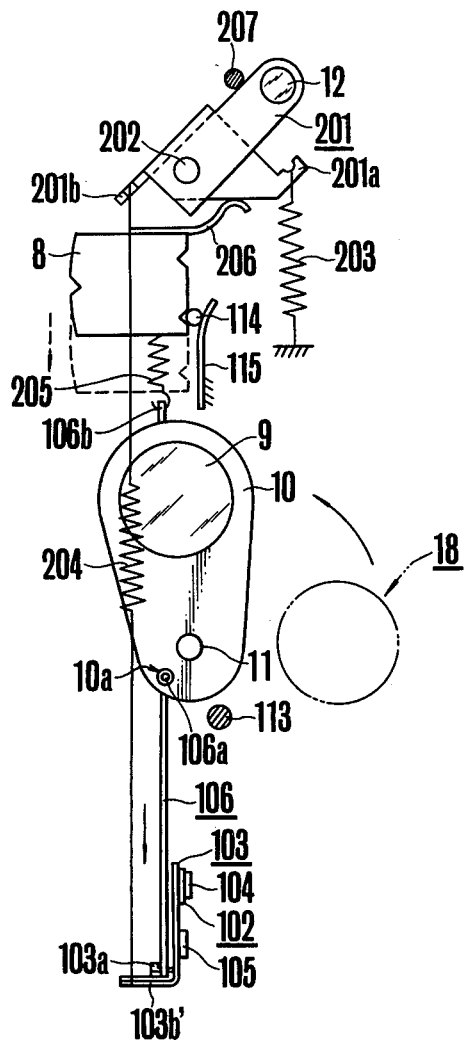

13 and 14 show the case the tungsten light photography is carried out with the tungsten type film while FIGS. 15 and 16 show the case the tungsten light photography is carried out with the daylight film, whereby only the components improved in accordance with the present invention are shown as in case of other embodiments.

In the drawings, 201 is the filter holding member for holding the ND filter 12, being rotatably born by means of a pin 202 provided on the camera body, whereby by means of the spring member 203 provided between the one projecting arm 201a and the camera body the filter holding member 201 is urged around the pin 202 along the clockwise direction in FIG. 12 while the other projecting arm 202b is connected with the second operation arm 103b' of the rotary member 103 through the spring member 204. 205 is a spring member provided between the folded arm 106b of the connecting rod 106 and the camera body so as to urge the rod 106 upwards in the drawing, while 206 is a holding member for holding the filter holding member 201 so as to make the ND filter 12 remain in the incident light optical path 0', being secured on the operation nob 8. 207 is a secured pin for controlling the counter-clockwise direction of the filter holding member 201 so as to keep the ND filter 9 in the inserted state into the incident light optical path 0' while 208 (FIGS. 13 and 14) is a pin for controlling the clockwise rotation of the filter holding member 201 so as to keep the ND filter 9 is in retired state out of the incident light optical path 0'.

When with the above mentioned composition the film cartridge 1 containing a tungsten type film is loaded into the camera as is shown in the drawing, because hereby a notch 1b is formed on the front outer wall 1a of the cartridge 1 containing the tungsten type film, the end 102a of the detecting member 102 enters into the notch 1b so that the detecting member 102, the rotation member 103 and the connecting rod 106 after the detecting member 102 are not displaced.

In the state in which the nob 8 is set at the index D and the camera is set in the daylight photographic mode as is shown in FIGS. 11 and 12, the A type filter 9 is held in the inserted state into the photographic optical path 0 because the connecting rod 106 is not displaced while the ND filter 12 is held in the inserted state into the incident light optical path 0' because the filter holding member 201 is held by means of the holding member 206.

When then in order to carry out the tungsten light photography the knob 8 is operated so as to set at the index A out of the above mentioned state (FIGS. 13 and 14), the folded end 106b of the connecting rod 106 is pushed by the operation end 8b of the knob 8 so as to be displaced downwards against the effect of the spring member 205 in the drawing, whereby by means of the folded part 106a the filter holding member 10 is rotated around the pin 11 along the counter-clockwise direction in the drawing so as to take the A type filter 9 out of the photographic optical path 0. Further because at this time, the engagement of the filter holding member 201 by means of the holding member 206 is solved, the holding member 201 is rotated around the pin due to the effect of the spring member 203 along the clockwise direction in FIG. 14 until the rotation is controlled by means of a fixed pin 208 so that the ND filter 12 is taken out of the incident light optical path 0'.

In this way the change over of the photographic modes between the daylight photography and the tungsten light photography using the tungsten type film is achieved.

Below the case the daylight film is used will be explained in accordance with FIGS. 15 and 16.

When the film cartridge 1' containing a daylight film is loaded into the camera in the drawing, because in the present case no notch has been formed on the front outer wall 1a' of the cartridge 1' containing the daylight film, the detecting member 102 is pushed to the right by means of the outer wall 1a' in FIG. 15 in such a manner that the rotary member 103 is rotated around the shaft 105 along the clockwise direction in FIG. 15 whereby by means of the first operation arm 103a the folded part 106c of the connecting rod 106 is pushed so as to be moved downwards in the drawing. Due to the then displacement of the connecting rod 106 the filter holding member 10 is rotated around the pin 11 along the counter clockwise direction in FIG. 16 in such a manner that the A type filter 9 is taken out of the photographic optical path 0.

Because on the other hand at the time of the rotary displacement of the rotary member 103 the one end of the spring member 204 is attracted by means of the second operation arm 103b' of the rotary member 103, the filter holding member 201 is urged around the pin 202 along the counter clockwise direction by means of an effect larger than that of the spring member 203 in FIG. 16 so that regardless of the operation of the nob 8 the filter holding member 201 is kept in a state in which the rotation is prohibited by means of the pin, namely the ND filter 12 is held in the inserted state into the incident light optical path 0'.

Below an embodiment of the exposure meter device applicable to the motion picture camera explained so far will be explained in accordance with FIG. 17.

Figure 17:
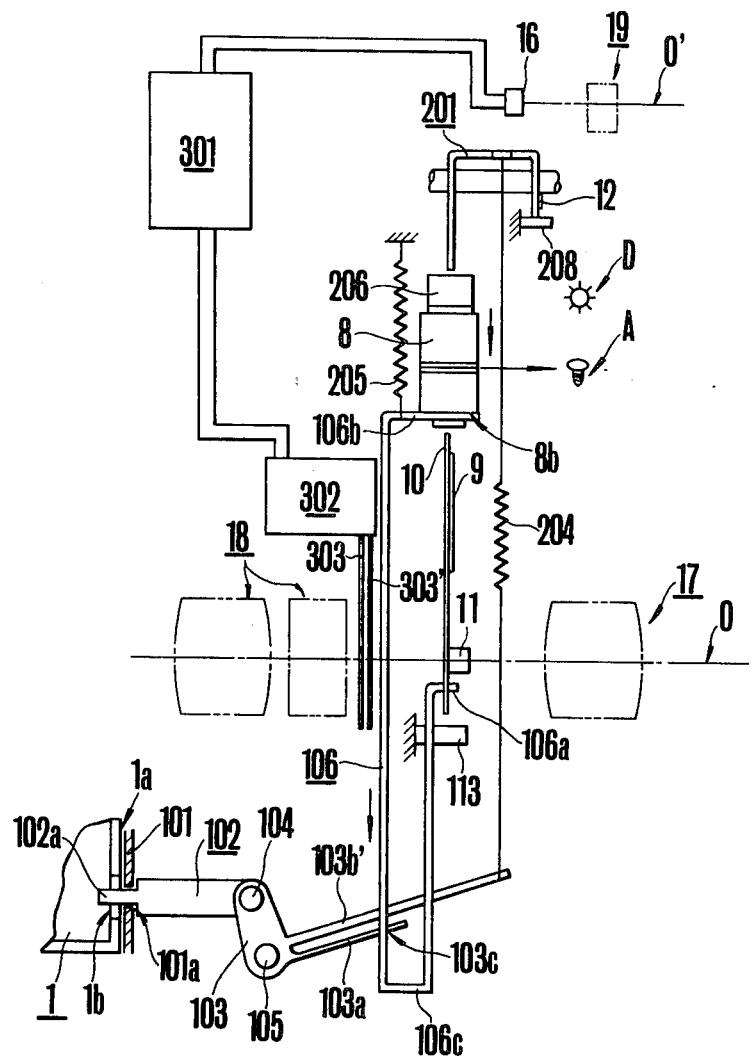
FIG. 17 shows the important composition of the embodiment shown in FIGS. 11 to 16, whereby the exposure meter device is composed as a meter aperture device.

FIG. 17 shows the embodiment shown in FIGS. 11 to 16 whereby the exposure meter device is composed as meter aperture device. In the drawing 303 and 303' are the two diaphragm blades for determining the photographic aperture size, being provided in the photographic optical path 0. 302 is a meter for driving the diaphragm blades 303 and 303', while 301 is an exposure control circuit for controlling the meter 302 in accordance with the output of the light sensing element 16.

In the state shown in the drawing, the A type filter 9 and the ND filter 12 have respectively been retired out of the photographic optical path 0 and the incident light optical path 0', which state corresponds to the case the tungsten light photography is carried out with the tungsten type film. In case the daylight photography or the tungsten light photography is carried out with the tungsten type film, the ND filter 12 is inserted into or retired out of the incident light optical path 0' in accordance with the change over of the photographic modes in such a manner that the sensitivity of the meter aperture device (16, 301, 302, 303, 303') is properly changed over.

Lastly an embodiment so designed that the composition of the sensitivity of the exposure meter device in accordance with the change over of the photographic modes is carried out by means of electrical means such as resistances and so on will be explained below in accordance with FIG. 18.

Figure 18:
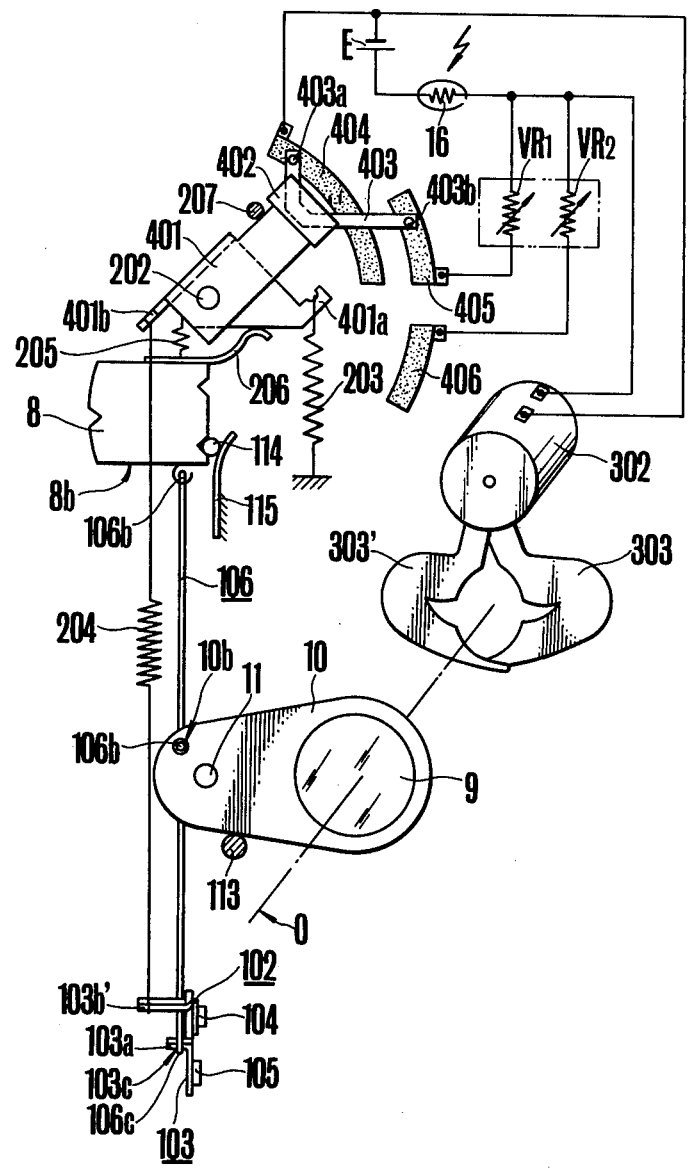

FIG. 18 shows the embodiment shown in FIGS. 11 to 16 and FIG. 17 whereby the compensation of the sensitivity of the exposure meter device in connection with the change over of the photographic means is carried out by means of the change over of the resistance value instead of the insertion and the retirement of the ND filter into and out of the incident light optical path 0'. In consequence the components presenting the same figures as those in FIGS. 11 to 17 have the same compositions and the same functions of those in FIGS. 11 to 17 so that their explanations are omitted so far as the present embodiment can be understood.

In the drawing, 401 is the contact holding member designed almost in the same way as the filter holding member 201 in FIGS. 11 to 17, being rotatably born by means of the pin 202, whereby the one end of the spring 203 is engaged with the one projecting arm 401a while the one end of the spring member 204 is engaged with the other projecting arm 401b. 402 is an insulation plate secured on one part of the holding member 401, whereby on the insulation plate a contact piece 403 presenting the first and the second contact 403a and 403b are secured so as to be changed over the first, the second and the third resistance piece 404, 405 and 406 by means of the contacts 403a and 404b.

The above mentioned light sensing element 1b and the above mentioned meter 304 are connected in series with the current source E whereby to the contact point of the light sensing element 16 with the meter 302 the variable resistance $VR_1$ and $VR_2$ for setting the film sensitivity (ASA) are connected. Hereby the first resistance piece 404 is connected to the current source E, while the second and the third contact pieces 405 and 406 are respectively connected to the variable resistances $VR_1$ and $VR_2$. Further the three resistance pieces 404, 405 and 406 are connected to each other.

The state with the above mentioned composition shown in the drawing corresponds to the case the daylight photography is carried out with the tungsten type film, whereby in the present state the first and the second contact 403a and 403b of the contact piece 403 are respectively in contact with the first and the second resistance pieces 404 and 405 in such a manner that these resistance pieces 404 and 405 are connected to the meter circuit so as to keep the exposure meter device up to a sensitivity proper to the daylight photography.

When in order to carry out the tungsten light photography the knob 8 is operated so as to be set at the index A out of the above mentioned state (FIG. 13), because quite in the same way as in case with the above mentioned filter holding member 201 the engagement of the contact piece holding member 401 by means of the holding member 206 is solved, the holding member 401 is rotated around the pin 202 along the clockwise direction (FIG. 14) by mean of the effect of the spring member 203 in the drawing until the rotation is stopped by means of the fixed pin 208 (FIGS. 13 and 14) in such a manner that the second contact 403b of the contact piece 403 is changed from the second resistance piece 405 over to the third resistance piece 406. (Hereby the first contact 403a is kept in contact with the first resistance piece 404).

In consequence, the first and the third resistance pieces 404 and 406 are connected to the meter circuit so as to compensate the sensitivity of the exposure meter device proper to the tungsten light photography.

Further, as is clear from the above mentioned composition, in order to carry out the daylight photography using the daylight film the second contact 403b of the contact piece 403 is kept in contact with the second contact piece 405 (FIG. 16) in such a manner that the first and the second resistance pieces 404 and 405 remain connected to the meter circuit.

As explained above in case of the motion picture camera in accordance with the present invention, by means of detecting whether the film is of the tungsten type or of the daylight type, the detecting means capable of determining the insertion and the retirement of the color conversion filter for adapting the tungsten type film to the daylight photography into and out of the photographic optical path is engaged with the holding means for holding the sensitivity of the exposure meter device in the state to be used for the daylight photography with the tungsten type film so as to keep the sensitivity of the exposure meter device in the state to be used for the daylight photography with the tungsten type film nullifying the insertion and the retirement of the above mentioned color conversion filter into and out of the photographic optical path and the operation of the manual operating means for compensating the sensitivity of the exposure meter device in accordance with the insertion and the retirement into and out of the photographic optical path so that the mis-operations as mentioned above which often take place in the conventional motion picture camera provided with the color conversion filter as well as the manual operation means as mentioned above especially when the daylight film is used, namely the misoperation to compensate the sensitivity of the exposure meter device in case of the tungsten light photography with the daylight film can be avoided in the fool-proof way so as to obtain a proper exposure always, which is quite profitable.

What is claimed is:

1. A motion picture camera capable of selectively using a first type film cartridge containing an artificial light type film and a second type film cartridge containing a daylight type film, comprising:
   a cartridge loading chamber in which either of the first type and the second type cartridges can be loaded;
   a filter means for adapting the artificial light type film to the photography in daylight, said filter means being shiftable between a first position inserted into the photographic optical path of the camera and a second position removed from the photographic optical path by changing over operation;
   an exposure device for determining the exposure value of the film;
   an adjusting means for adjusting the sensitivity of the exposure device, said adjusting means being changeable between a first state in which the adjusting means adjusts the sensitivity of the exposure device for daylight photography with the artificial light type film and a second state in which the adjusting means adjusts the sensitivity of the exposure device for the artificial light photography with the artificial light type film by changing over operation;
   an operation means manually operable from outside of the camera for changing over the filter means and the adjusting means, said operation means being operatively associated with the filter means and the adjusting means;
   a detecting means for detecting the kind of film contained in the film cartridge loaded into the film cartridge loading chamber, said detecting means being operatively engageable with the film cartridge loaded into the film cartridge loading chamber and setting the filter means to the second position only when the film cartridge loaded into the film cartridge loading chamber is of the second type; and a holding means for holding the adjusting means in the first state, said holding means being operatively associated with the detecting means and setting the adjusting means compulsorily to the first state when the detecting means detects the second type film cartridge, whereby when the daylight type film is used, the operation means is made ineffective and the sensitivity setting of the exposure device is compulsorily adjusted to be suitable for daylight photography with the artificial light type film.

2. A motion picture camera in accordance with claim 1, wherein the exposure device includes a light sensing means for the exposure measurement, and the adjusting means includes:

a filter member capable of adjusting the amount of the light impinging on the light sensing means, said filter member being shiftable between a first position inserted into the optical path of the light sensing means for adapting the sensitivity of the exposure device to the daylight photography with the artificial light type film and a second position retracted from the optical path of the light sensing means for adapting the sensitivity of the exposure device to the artificial light photography with the artificial light type film, by changing over operation, the holding means compulsorily setting the filter member to the first position when the detecting means detects the second type film cartridge.

3. A motion picture camera in accordance with claim 1, wherein the holding means includes:

an operation member for changing over the filter means from the first position to the second position, said member being functionally engaged with the detecting means when the detecting means detects the second type film cartridge, said member being capable of being operatively associated with the filter means.

4. A motion picture camera in accordance with claim 1, wherein the operation means includes:

a manually operable member for changing over the adjusting means between the first and the second states; and a cooperating member for changing over the filter means between the first and the second positions, said cooperating member being operatively associated with the manually operable member so as to be functionally engaged with the operable member in such a manner that the filter means is changed over from the first position to the second position when the operable member changes over the adjusting means from the first state to the second state, the detecting means being operatively connected with the cooperating member so as to shift the filter means to the second position independently of the manually operable member by actuating the cooperating member when the second type film cartridge is detected, the holding means setting the adjusting means to the first state independently of the manually operable member when the detecting means detects the second type film cartridge.

5. A motion picture camera in accordance with claim 4, wherein the operation means further includes:

a spring member provided between the adjusting means and the cooperating member so as to urge the adjusting means toward the second state, the manually operable member being capable of setting the adjusting means to the first state against the urging force of the spring means, the adjusting means being capable of being changed over to the second state by means of the urging force of the spring member when the setting to the first state by means of the operable member is released; and the holding means setting the adjusting means to the second state against the urging force of the spring member independently of the operable member when the detecting means detects the second type film cartridge.

6. A motion picture camera in accordance with claim 4, further comprising:

an urging means for urging the adjusting means toward the second state, said urging means being operatively connected with the adjusting means, the manually operable member being capable of setting the adjusting means to the first state against the urging force of the urging means, the adjusting means being capable of being changed over to the second state by means of the urging force of the urging means when the setting to the first state by the operable member is released and the holding means setting the adjusting means to the second state against the urging force of the urging means independently of the operable member when the detecting means detects the second type film cartridge.

7. A motion picture camera capable of selectively using a first type film cartridge containing an artificial light type film and presenting on one part a mark, indicating that the contained film is of the artificial light type and a second type film cartridge containing a daylight type film but presenting no such mark comprising:

a cartridge loading chamber in which the first type and the second type cartridges can be loaded;

a filter means for adapting the artificial light type film to the photography under the daylight, said filter means being shiftable between a first position inserted into the photographic optical path of the camera and a second position retracted from the photographic optical path of the camera by changing over operation;

an exposure device for determining the exposure value of the film;

an adjusting means for adjusting the sensitivity of the exposure device, said adjusting means being changeable between a first state in which the adjusting means adjusts the sensitivity of the exposure device suitable for the daylight photography with the artificial light type film and a second state in which the adjusting means adjusts the sensitivity of the exposure device suitable for the artificial light photography with the artificial light type film by changing over operation;

an operation means manually operable from outside of the camera for changing over the filter means and the adjusting means, said operation means operatively associated with the filter means and the adjusting means;

a detecting means for detecting the type of the film cartridge loaded in the cartridge loading chamber, said detecting means detecting the existence of the mark on the film cartridge loaded into the cartridge loading chamber and being compulsorily displaced when the film cartridge loaded into the cartridge loading chamber is the second type film cartridge; and a cooperating means for compulsorily setting the filter means to the second position and the adjusting means to the first state respectively, said cooperating means being operatively associated with the detecting means so as to set the filter means to the second position and the adjusting means to the first state when the detecting means detects the second type film cartridge, whereby when the daylight type film is used, the effect of the operation means is made ineffective and the sensitivity of the exposure device is compulsorily adjusted to be suitable for daylight photography with the artificial light type film.

8. A motion picture camera capable of selectively using a first type film cartridge containing an artificial light type film and presenting on one part a mark indicating that the contained film is of the artificial light type and a second type film cartridge containing a daylight type film but presenting no such mark, comprising:

a cartridge loading chamber in which the first type and the second type cartridges can be loaded;

a filter means for adapting the artificial light type film to the photography under the daylight, said filter means shiftable between a first position inserted into the photographic optical path of the camera and a second position removed from the photographic optical path of the camera by changing over operation;

an exposure device for determining the exposure value of the film;

an adjusting means for adjusting the sensitivity of the exposure device, said adjusting means being changeable between a first state in which the adjusting means adjusts the sensitivity of the exposure device suitable for the daylight photography with the artificial light type film and a second state in which the adjusting means adjusts the sensitivity of the exposure device suitable for the artificial light photography with the artificial light type film by changing over operation;

an urging means for urging the adjusting means toward the second state, said urging means operatively connected with the adjusting means;

a manually operable means for setting and keeping the adjusting means to the first state against the urging force of the urging means, the adjusting means being changeable to the second state by the urging force of the urging means when the setting to the first state by the operable means is released;

an engaging means for changing over the filter means between the first and the second positions, said engaging means being operatively connected with the filter means and at the same time operatively associated with the operable means, and functionally engaged with the operable means so as to change over the filter means from the first position to the second position when the operable means releases the setting of the adjusting means to the first state;

a detecting means for detecting the type of film cartridge loaded into the film cartridge loading chamber, said detecting means being capable of detecting the existence of the mark of the film cartridge loaded into the film cartridge loading chamber and operatively associated with the engaging means so as to be capable of changing over the filter means to the second position by actuating the engaging means in case the second type film cartridge is detected, independently of the operable means;

a holding means capable of holding the adjusting means to the first state against the urging force of the urging means independently of the operable means, said holding means being operatively connected with the detecting means so as to compulsorily set and keep the adjusting means to the first state in case the detecting means detects the second type film cartridge, whereby when the daylight type film is used, the effect of the operable means is made ineffective and the sensitivity of the exposure device is compulsorily adjusted to be suitable for daylight photography with the artificial light film.

9. A motion picture camera capable of selectively using a first type film cartridge containing an artificial light type film and presenting on one part a mark indicating that the contained film is of the artificial light type and a second type film cartridge containing a daylight type film but presenting no such mark, comprising:

a cartridge loading chamber into which the first type and the second type cartridges can be loaded;

a first filter means for adapting the artificial light type film to the photography under the daylight, said first filter means being shiftable between a first position inserted into a photographic optical path of the camera and the second position removed from the photographic optical path of the camera by changing over the operation;

an exposure device for determining the value of the exposure of the film, said exposure device including a light sensing means for the exposure measurement;

a second filter means for adjusting the sensitivity of the exposure device, said second filter means being shiftable between a first position inserted into the optical path of the light sensing means so as to adapt the sensitivity of the exposure device to the used state of the artificial light type film to the photography under the daylight and a second position removed from the optical path of the light sensing means so as to adapt the sensitivity of the exposure device to the used state of the artificial light type film to the photography under the artificial light by changing over operation;

an operation means manually operable from outside of the camera for changing over the first and the second filter means, said operation means being operatively associated with the first and the second filter means;

a detecting means for detecting the type of the film cartridge loaded into the film cartridge loading chamber, said detecting means detecting the existence of the mark on the film cartridge loaded into the cartridge loading chamber and being compulsorily displaced only when the film cartridge loaded into the cartridge loading chamber is the second type film cartridge; and an engaging means compulsorily setting the first filter means to the second position and the second filter means to the first position, said engaging means being operatively associated with the detecting means so as to compulsorily set and keep the first filter means to the second position and the second filter means to the first position when the detecting means detects the second type film cartridge, whereby when the daylight type film is used, the effect of the operation means is made ineffective and the sensitivity of the exposure device is compulsorily adjusted to be suitable for daylight photography with the artificial light film.

10. A motion picture camera capable of selectively using a first type film cartridge containing an artificial light type film and presenting on one part a mark indicating that the contained film is of the artificial light type and a second type film cartridge containing a daylight type film but presenting no such mark, comprising:

a cartridge loading chamber into which the first type and the second type cartridges can be loaded;

a first filter means for adapting the artificial light type film to the photography under the daylight, said first filter means being shiftable between a first position inserted into the photographic optical path of the camera and a second position removed from the photographic optical path of the camera by changing over operation;

an exposure device for determining the value of the exposure of the film, said exposure device including a light sensing means for the exposure measurement;

a second filter means for adjusting the sensitivity of the exposure device, said second filter means being shiftable between a first position inserted into the optical path of the light sensing means so as to adapt the sensitivity of the exposure device to the used state of the artificial light type film to the photography under the daylight and a second position removed from the optical path of the light sensing means so as to adapt the sensitivity of the exposure device to the used state of the artificial light type film to the photography under the artificial light by changing over operation;

an urging means for urging the second filter means toward the second position, said urging means being operatively connected with the second filter means;

a manually operable means for setting and keeping the second filter means to the first position against the urging force of the urging means, the second filter means being shiftable to the second position by the urging force of the urging means in case the setting to the first position by said operable means is released;

an engaging means for changing over the first filter means between the first and the second positions, said engaging means being operatively connected with the first filter means and at the same time operatively associated with the operable means so as to change over the first filter means from the first position to the second position when the setting of the second filter means to the first position by means of the operable means is released;

a detecting means for detecting the type of the film cartridge loaded into the film cartridge loading chamber, said detecting means being capable of detecting the existence of the mark on the outer wall of the film cartridge loaded into the film cartridge loading chamber and at the same time operatively associated with the engaging means so as to change over the first filter means to the second position independently of the operable means by actuating the engaging member when the second type film cartridge is detected; and a holding means for holding the second filter means to the first position independently of the operable means against the urging force of the urging means, said holding means being operatively connected with the detecting means so as to compulsorily set the second filter means to the first position when the detecting means detects the second type film cartridge;

whereby when the daylight type film is used, the effect of the operation means is made ineffective and the sensitivity of the exposure device is compulsorily adjusted suitable for the daylight photography with the artificial light type film.

* * * * *